United States Patent [19]
Aleshi

[11] Patent Number: 6,021,499
[45] Date of Patent: Feb. 1, 2000

[54] ISOLATED GROUND REFERENCE DC POWER SUPPLY

[75] Inventor: Rassoul Aleshi, Campbell, Calif.

[73] Assignees: Sony Corporation of Japan, Tokyo, Japan; Sony Electronics, Inc., Park Ridge, N.J.

[21] Appl. No.: 09/050,957

[22] Filed: Mar. 31, 1998

[51] Int. Cl.$^7$ ..................................................... G06F 1/26
[52] U.S. Cl. ............................................. 713/300; 363/15
[58] Field of Search ........................... 713/300; 709/223, 709/250; 710/101; 363/17, 63, 81, 65, 98, 15; 323/215; 307/82, 43, 409; 361/435, 436; 370/901, 908; 340/286.02

[56] References Cited

U.S. PATENT DOCUMENTS

| | | | |
|---|---|---|---|
| 4,167,710 | 9/1979 | Suzuki et al. | 330/298 |
| 5,252,911 | 10/1993 | Banura | 323/357 |
| 5,365,407 | 11/1994 | Nakabayashi et al. | 361/794 |
| 5,483,436 | 1/1996 | Brown et al. | 363/98 |
| 5,737,202 | 4/1998 | Shimamori | 363/65 |
| 5,767,631 | 6/1998 | Konopka et al. | 315/307 |
| 5,914,865 | 6/1999 | Barbehenn et al. | 363/21 |

*Primary Examiner*—Gopal C. Ray
*Attorney, Agent, or Firm*—Wagner, Murabito & Hao LLP

[57] ABSTRACT

The present invention is a method and system for flexibly and efficiently providing electrical power within a computer system. The present invention comprises an isolated ground reference direct current power supply, including an AC/DC converter that transforms alternating current into direct current and an isolation component that provides DC voltage outputs. At least two of the DC voltage outputs have ground references that are isolated from one another in a manner that is compliant with IEEE 1394 requirements. One of the ground references is supplied as the chassis ground for the computer system and is coupled to most of the components of the computer system. Another of the ground references is isolated from the chassis ground reference and is coupled to the physical layer of an IEEE serial communications circuit. A DC to DC converter is used with the power supply to generate the isolated ground reference for the physical layer.

20 Claims, 7 Drawing Sheets

ISOLATED GROUND REFERENCE DC POWER SUPPLY

FIELD OF THE INVENTION

The present invention relates to the field of power supplies. More particularly, the present invention relates to an isolated ground reference direct current power supply.

BACKGROUND OF THE INVENTION

Computer systems are usually made up of several components that cooperate with each other to achieve a desired result. Typically, the components of a computer system require electrical power in order to perform their prescribed tasks. Each of the various components has its own electrical power requirements and they are not necessarily the same. Some components require electrical power with different electrical characteristics than the power supplied to other components. For example, some components may require higher or lower voltage than other components, some components may require greater or lesser current than other components, or some components may utilize alternating current (AC) and some direct current (DC). In certain instances, it is advantageous for some of the components to have a ground reference that is isolated from the ground reference of other components.

Implicit in a scheme of components with varying electrical power requirements, such as isolated ground references, is the ability to transmit electrical power to the components in an appropriate and compatible manner. If electrical power is not transmitted correctly to the components of the computer system the components will not function accurately. Developing conventions that set forth the physical and operational characteristics of computer systems is one way to ensure that electrical power is transmitted in an appropriate and compatible manner. Typically, conventions are specified in standards promulgated by industry organizations.

An organization that specifies standards for the computer industry is the Institute of Electrical and Electronics Engineers (IEEE). One standard the IEEE has promulgated is the IEEE 1394, which primarily specifies conventions for high speed serial system communications. IEEE 1394 communication is utilized in conjunction with computer systems, audio and video products, printer and scanner products for imaging, hard disks (especially arrays) and digital video camera recorders and displays. As part of specifying conventions for high speed communications, IEEE 1394 also specifies some electrical power conventions regarding the various components involved in the high speed communications. In particular, IEEE 1394 addresses instances where some computer systems are organized in a system of layers. It is preferable to have some of the components of the computer system associated with a physical layer tied to a reference ground that is isolated from other components.

Normally it is desirable to have a link layer and physical layer of the IEEE standard that are capable of operating in an isolated mode in which the ground references of the two layers are isolated. IEEE 1394 specifies that the link layer and physical layer of a computer system be capable of operating in an isolated mode. In addition IEEE 1394 specifies that the link layer be tied to a system ground in isolation mode. In most computer systems the system ground is a chassis ground that is usually tied to earth ground. Thus, in isolation mode the physical layer ground is isolated from the chassis ground.

In the prior art, isolated ground references are achieved by utilizing at least two different electrical power supplies with ground references that are isolated from one another. One power supply feeds electrical power to some of the components and another separate power supply provides electrical power to other components that require ground references that are isolated from ground references of the first power supply. Although this prior art mechanism provides a separate power supply to the physical layer circuit, it is extremely costly because two power supplies are used. The addition of the second power supply also adds undue complexity to the overall system and increases the likelihood of system failure because multiple power systems are required.

SUMMARY OF THE INVENTION

What is needed is a more cost effective mechanism for providing an isolated power supply to the physical layer circuit of a computer system. Accordingly, the present invention provides an efficient means of providing electrical power that satisfies the differing requirements of the various components in a computer system, particularly for IEEE 1394 applications. The present invention takes advantage of the efficiencies associated with constructing an individual power supply, and avoids inefficiencies of duplication associated with multiple power supplies. The present invention's power supply is capable of providing voltages to components at the same or differing levels and with the same or isolated ground references.

The present invention is a method and system for efficiently providing electrical power to a computer system. It provides electrical power in a manner that satisfies the differing requirements of the various components in the computer system. The present invention is capable of providing electrical power to components in the computer system at the same or differing voltage levels and with the same or isolated ground references. The present invention provides these varying voltage characteristics in a manner that takes advantage of the efficiencies associated with a single power supply configuration.

In one embodiment, the present invention comprises a direct current computer system power supply with a plurality of outputs, at least two of which have ground references that are isolated from one another. One of the isolated ground references is isolated from the chassis ground and is supplied to the physical layer of an IEEE 1394 serial communication device. The direct current power supply system of the present embodiment includes an alternating current source, an alternating current to direct current converter, and an isolation component. The isolation component provides direct current tied to a ground reference which is isolated from other ground references associated with the direct current computer system power supply.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a method and apparatus for an isolated ground reference direct current power supply, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a method and system for flexibly and efficiently providing electrical power to a computer system. The present invention provides electrical power in a variety of configurations that satisfy the differing requirements of diverse components in the computer system. The present invention is capable of providing voltages to components in the computer system at the same or differing voltage levels and with the same or isolated ground references. For example, the present invention is capable of supplying different voltages to a link layer and a physical layer of a computer system, with the different voltages having ground references that are isolated from one another in a manner that satisfies the requirements of IEEE 1394. The present invention also takes advantage of the efficiencies associated with constructing an individual (e.g., single) power supply and avoids wasteful duplications that result with multiple power supplies.

Figure 1A:
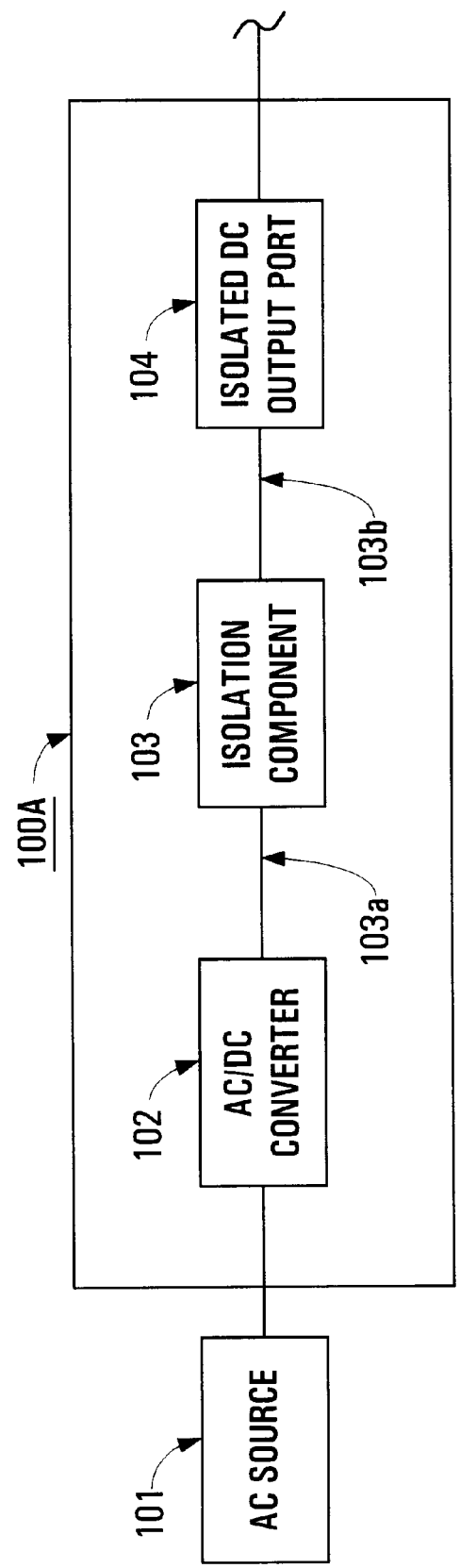
FIG. 1A is a block diagram of an isolated ground reference direct current power supply of one embodiment of the present invention.

FIG. 1A shows a block diagram of an isolated ground reference direct current power supply 100A in accordance with one embodiment of the present invention. Isolated ground reference direct current power supply 100A receives alternating voltage from an alternating current source 101, and comprises an AC/DC (alternating current to direct current) converter 102, isolation component 103 and isolated DC output port 104. Alternating current source 101 supplies alternating current to AC/DC converter 102. AC/DC converter 102 transforms the alternating current into direct current. The direct current from AC/DC converter 102 is fed into isolation component 103. Isolation component 103 electrically isolates the direct current ground reference in that the input 103a of isolation component 103 has a ground reference that is isolated from the ground reference of the output 103b of isolation component 103. The output 103b of isolation component 103 is fed into isolated DC output port 104.

Figure 1B:
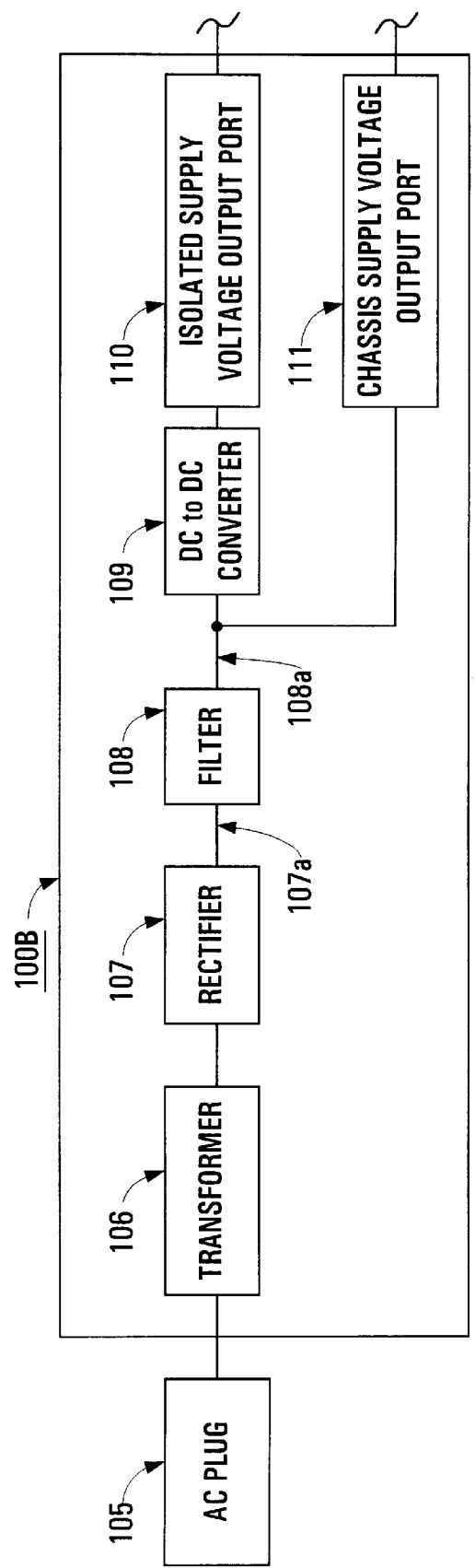
FIG. 1B is a block diagram of an isolated ground reference direct current power supply of another embodiment of the present invention.

FIG. 1B shows another embodiment of an isolated ground reference direct current power supply 100B. Isolated ground direct current power supply 100B receives alternating voltage in accordance with the present invention via an AC plug 105 and comprises transformer 106, rectifier circuit 107, filter 108, DC to DC converter 109, isolated supply voltage output port 110 and chassis supply voltage output port 111. AC plug 105 is a standard outlet plug that connects to normal U.S. 120 volt/60 hertz utility power in one embodiment. When connected to an alternating current source, AC plug 105 feeds alternating current into a transformer 106 which transforms the alternating current power into a different alternating current voltage level. The different alternating current voltage level is fed into a rectifier circuit 107. Rectifier circuit 107 changes the alternating current into a pulsating direct current on output 107a. The pulsating direct current is then put through filter 108 which minimizes the fluctuations, resulting in a filtered direct current on output 108a. The filtered direct current is coupled to chassis supply voltage output port 111. The filtered direct current is also fed into DC to DC converter 109. DC to DC converter 109 provides a direct current voltage output that has a ground reference that is electrically isolated from the ground reference of the direct current voltage supplied to DC to DC converter 109. The direct current electrical power provided by DC to DC converter 109 is coupled to isolated supply voltage output port 110.

Figure 1C:
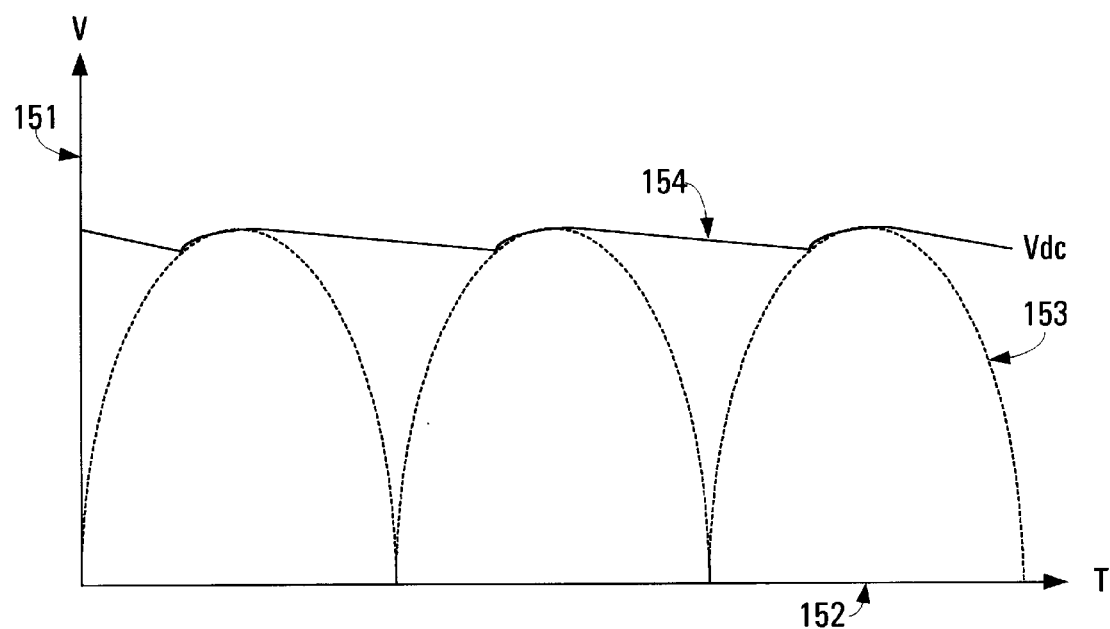
FIG. 1C is a graph illustrating the direct current voltage at various points in the isolated ground reference direct current power supply embodiment of the present invention illustrated in FIG. 1B.

FIG. 1C is a graph illustrating the direct current voltage at various points in the isolated ground reference direct current power supply 100B. The graph comprises a vertical axis 151, a horizontal axis 152, a pulsating direct voltage waveform 153 and a filtered direct voltage waveform 154. Vertical axis 151 represents a voltage (V) and horizontal axis 152 represents a time (T). Pulsating direct voltage waveform 153 appears at output 107a in isolated ground reference direct current power supply 100B. Filtered direct voltage waveform 154 appears at output 108a in isolated ground reference direct current power supply 100B.

Figure 2:
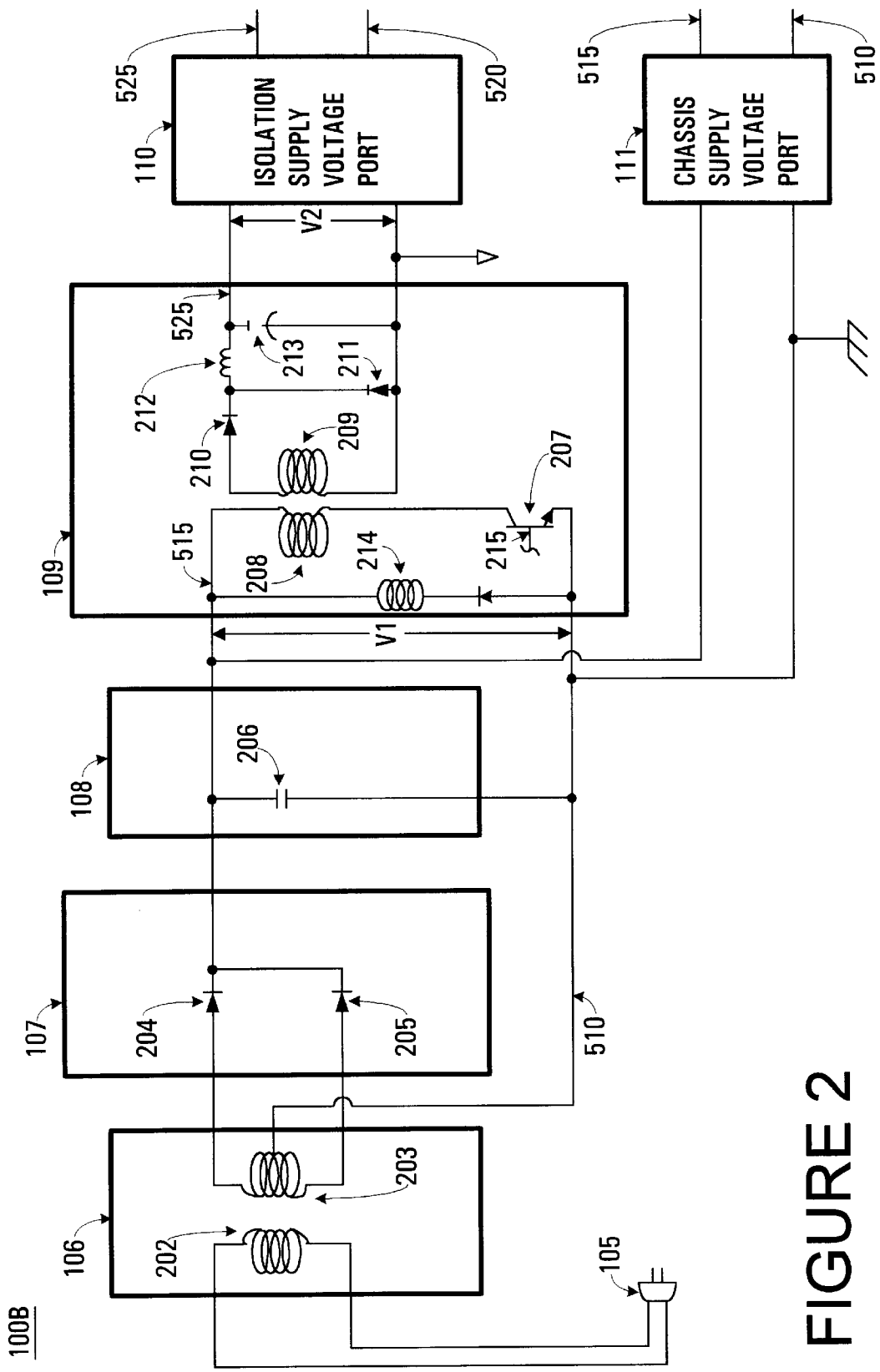
FIG. 2 is a circuit schematic illustrating one embodiment of isolated ground direct current power supply of the present invention.

FIG. 2 shows a more detailed circuit schematic of one embodiment of isolated ground reference direct current power supply 100B in accordance with present invention. Transformer 106 comprises primary inductance coil 202 and center tapped secondary inductance coil 203. Transformer 106 operates on well known principles of mutual inductance. An alternating current is passed through the primary inductance coil 202 which causes a varying magnetic flux field to expand and contract about primary inductance coil 202. The varying magnetic flux field is large enough that as it expands and contracts it cuts through center tapped secondary inductance coil 203, causing two alternating currents that are 180 degrees out of phase to flow through each half of center tapped secondary inductance coil 203. The center tap off of center tapped secondary inductance coil 203 is tied to the chassis ground reference 510.

In one embodiment of the present invention rectifier circuit 107 is a full wave rectifier comprising a positive half cycle diode 204 and a negative half cycle diode 205, both coupled to secondary inductance coil 203 on one end and to each other on the other end. During a positive half cycle of input voltage across the primary inductance coil 202, the positive half cycle diode 204 is forward biased and current flows through positive half cycle diode 204. Negative half cycle diode 205 is reverse biased through a positive half cycle of input voltage across the primary inductance coil 202 and thus current is prevented from flowing through negative half cycle diode 205. However, while there is a negative half cycle of input voltage across the primary inductance coil 202, the negative half cycle diode 205 is forward biased and current flows through the negative half cycle diode 205. Positive half cycle diode 204 is reverse biased and thus current is prevented from flowing through positive half cycle diode 204. Thus the output of rectifier circuit 107 is a full wave rectified pulsating direct current with a pulsating direct voltage waveform.

Filter 108 of FIG. 2 comprises a filter capacitor 206 coupled between 515 and line 510. Filter capacitor 206 charges quickly through the positive slope of the pulsating direct current. However, filter capacitor 206 discharges relatively slowly during the negative slope of the pulsating direct current. This results in smoother direct current with a filtered direct voltage waveform of chassis voltage level 515 at the output of filter 108.

DC to DC converter 109 of this embodiment of the present invention comprises an insulated gate bipolar transistor 207, a converter primary inductance coil 208, a converter secondary inductance coil 209, an increasing field diode 210, a decreasing field diode 211, an output inductor 212, an output capacitor 213, a clamp winding 214 and a clamp diode 215. The emitter of the insulated gate bipolar transistor 207 is coupled to chassis ground 510 and the anode end of clamp diode 215. The collector of the insulated gate bipolar transistor 207 is coupled to one end of converter primary inductance coil 208. The other end of a converter primary inductance coil 208 is coupled to the one end of clamp winding 214. The other end of end clamp winding 214 is coupled to the cathode end of clamp diode 215. One end of converter secondary inductance coil 209 is coupled to the anode side of increasing field diode 210 and the other end of converter secondary inductance coil 209 is coupled to the anode side of decreasing field diode 211. The cathode sides of increasing field diode 210 and decreasing field diode 211 are coupled to one end of output inductor 212. The other end of output inductor 212 is coupled to one end of capacitor 213. The other side of capacitor 213 is coupled to the anode side of decreasing field diode 211. Isolated supply voltage output port 110 is coupled in parallel across capacitor 213.

The direct current output of DC to DC converter 109 has an isolated ground reference 520 that is isolated from the ground reference 510 of the direct current voltage supplied to DC to DC converter 109. In the present embodiment, the voltage level V2 of the direct current voltage output from DC to DC converter 109 is the same as the direct current voltage level V1 fed into DC to DC converter 109. It should be appreciated that by employing well know electrical transformer techniques the voltage level of the direct current voltage V2 output from DC to DC converter 109 can be increased or decreased relative to V1.

Insulated gate bipolar transistor 207 of FIG. 2 operates as a high frequency switch that closes and opens. While insulated gate bipolar transistor 207 is closed, current flows through converter primary inductance coil 208. When insulated gate bipolar transistor 207 is open, no current flows through converter primary inductance coil 208. The change of current flow through the converter primary inductance coil 208 is very fast but it does not reach maximum flow instantaneously. In effect, the current increases to its maximum during a period of time and decreases over a period of time.

Secondary inductance coil 209 is located in close proximity to converter primary inductance coil 208. By causing the current through primary inductance coil 208 to increase when it starts flowing and decrease when it stops flowing, a fluctuating magnetic flux field expands about converter secondary inductance coil 209. Mutual inductance causes an alternating current to flow through converter secondary inductance coil 209 to increasing field diode 210 and decreasing field diode 211.

Increasing field diode 210 and decreasing field diode 211 of FIG. 2 operate similarly to the positive half cycle diode 204 and negative half cycle diode 205 of rectifier circuit 107. When the electric field about converter secondary inductance coil 209 is increasing, current flows through increasing field diode 210 and not decreasing field diode 211. When the electric field about converter secondary inductance coil 209 is decreasing, the current flows through decreasing field diode 211 and not increasing field diode 210.

Output capacitor 213 and output inductor 212 of isolation unit 109 act as filters that smooth out the ripple effect of pulsating direct current. Output capacitor 213 behaves similarly to filter capacitor 206, the charging and discharging of output capacitor 213 operates to smooth the negative slope of the pulsating direct current. Inductor 212 further reduces the ripple effect by smoothing out both slopes of the pulsating current. As the current increases or decreases through the inductor it builds up a magnetic flux that induces a voltage. In accordance with principles of physics such as Lenz' law, the induced voltage across the inductor opposes the change in the pulsating current. Thus, by opposing the changes in the pulsating current the output inductor acts to smooth out the pulsating current.

Clamp winding 214 and a clamp diode 215 of isolation unit 109 operate together to drain the converter primary inductance coil 208. As a result, there is very little stored energy in the present embodiment. In addition the present embodiment is usually operated in a continuous current mode to reduce the peak currents and stability problems.

DC to DC converter 109 of the present embodiment is one example of a direct current to direct current converter. Direct current to direct current converters of various designs can be used in accordance with the present invention and with specific requirements of particular computer systems and are capable of providing different results in certain situations. For example, isolated direct current to direct current converters manufactured by Datel, Inc., 11 Cabot Boulevard, Mansfield, Mass. 02048-1151 can be used within the present invention.

The voltage outputs of isolated ground reference direct current power supply 100B shown in FIG. 2 flow through chassis supply voltage output port 111 and isolated supply voltage output port 110. In the present embodiment these output ports are standard male/female computer power cable connection devices. Chassis supply voltage output port 111 and isolated supply voltage output port 110 do not electrically alter signals passing through them. Isolated supply voltage output port 110 facilitates connection of isolation supply voltage level 525 and isolated ground reference 520 to other components in the computer system. Chassis supply voltage output port 111 facilitates connection of chassis voltage level 515 and chassis ground reference 510 to other components in the computer system.

Figure 3A:
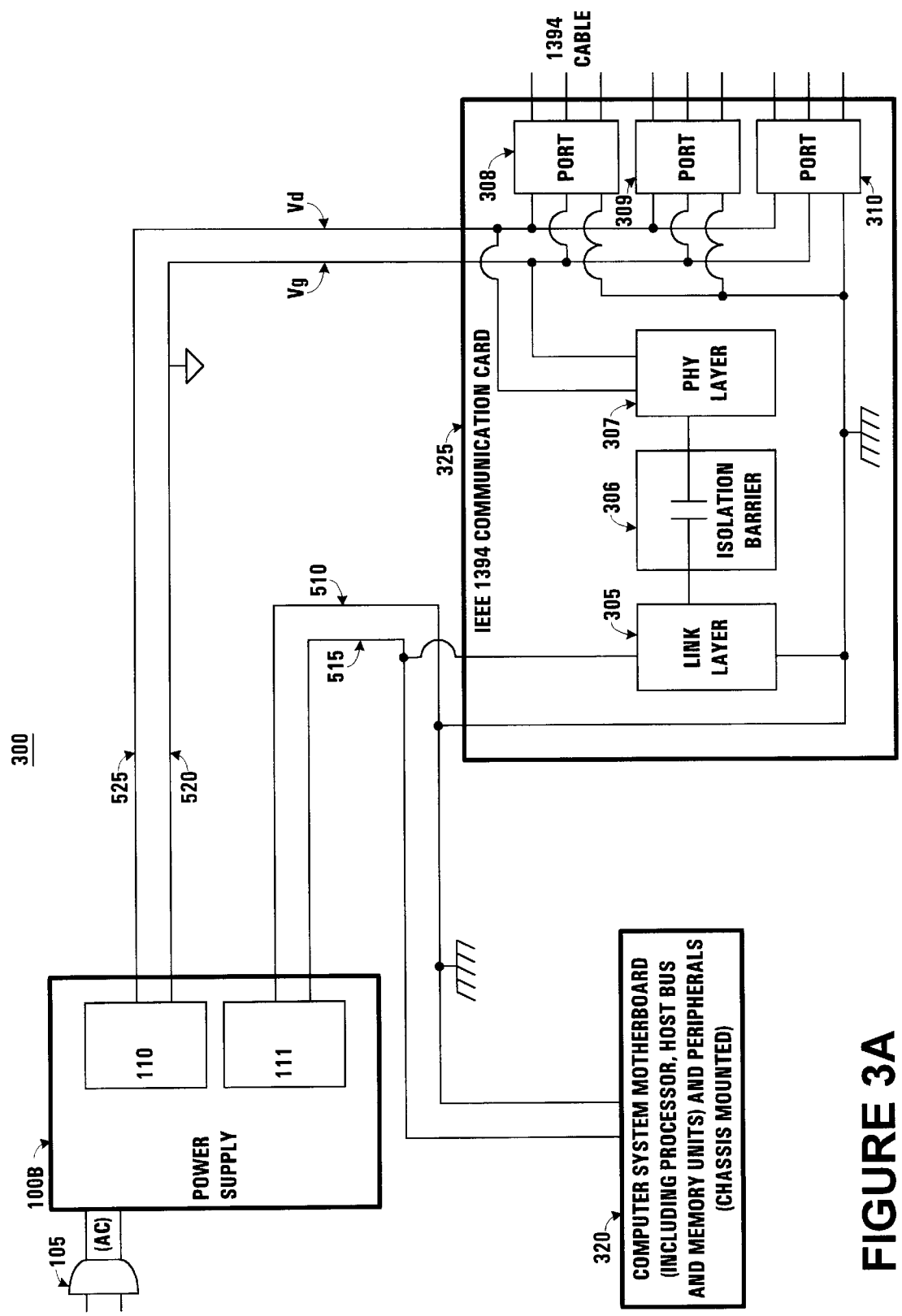
FIG. 3A shows one embodiment of an isolated ground direct current power supply system coupled to a link layer and a physical layer in accordance with the present invention.

FIG. 3A shows one embodiment of computer DC power supply system 300 in accordance with the present invention. Some components of the schematic of computer DC power supply system 300 are not shown as to not unnecessarily obscure the invention. Computer DC power supply system 300 comprises an isolated ground DC power supply 100B, an IEEE 1394 communications card 325, and a computer system mother board and peripherals 320.

As indicated above, DC power supply 100B receives alternating voltage from an alternating current source through AC plug 105. The alternating voltage is transformed into direct voltages. Isolation supply voltage level 525 and isolated ground reference 520 are fed from isolated supply voltage output port 110 to other components in the computer system. Chassis voltage level 515 and chassis ground reference 510 are fed from chassis supply voltage output port 111 to other components in the computer system.

Computer system mother board and peripherals 320 comprise a processor, host bus, memory units and chassis mounted peripherals. These components are standard components found in general purpose systems. For example, in one embodiment of the present invention the processor is a pentium II 300 MHtz Intel processor connected by a PCI bus to a 4 gigabit hard drive.

IEEE 1394 communications card 325 comprises a link layer chip 305, an isolation barrier 306, a physical layer chip 307, and ports 308, 309 and 310. Link layer chip 305 controls communications at a link layer level. Isolation barrier 306 provides an obstruction to the passage of direct current between link layer chip 305 and physical layer 307. Physical layer chip 307 controls communications at a physical layer level. Ports 308, 309 and 310 are standard IEEE 1394 compliant connectors that facilitate connection to standard IEEE 1394 cables.

The physical layer circuit 307 is a well known circuit and defines the low level characteristics of the electrical and mechanical interface between devices. For example, the physical layer 307 of the present embodiment addresses such concerns as the configurations of connectors, establishes the voltage levels that represent cutoffs for defining binary values, and defines the structure of bit-streams that flow between the devices. In addition to the actual data transmission, the physical layer 307 also provides arbitration directed at ensuring all devices have sufficient opportunity to access buses.

The link layer circuit 305 is a well known circuit and is a higher level component that encodes and frames data for bit transmission and reception in the physical layer 307. For example, the link layer 305 ensures reliable transmission between devices by providing error detection and control. The link layer bit transmission protocol provides two types of data packet delivery; asynchronous and isynchronous. Asynchronous is a conventional transmit-acknowledgment protocol and isynchronous is a real time guaranteed bandwidth protocol for just-in-time delivery of information.

FIG. 3A also illustrates the ability of the present invention to supply different voltages to the link layer 305 and the physical layer 307 of a computer system in a manner that satisfies the requirements of IEEE 1394 communication standards. Isolation supply voltage level 525 and isolated ground reference 520 are coupled to physical layer chip 307. Chassis voltage level 515 and chassis ground reference 510 are coupled to link layer chip 305. Isolation supply voltage level 525, isolated ground reference 520 and chassis ground reference 510 are also coupled in parallel to ports 308, 309 and 310.

Figure 3B:
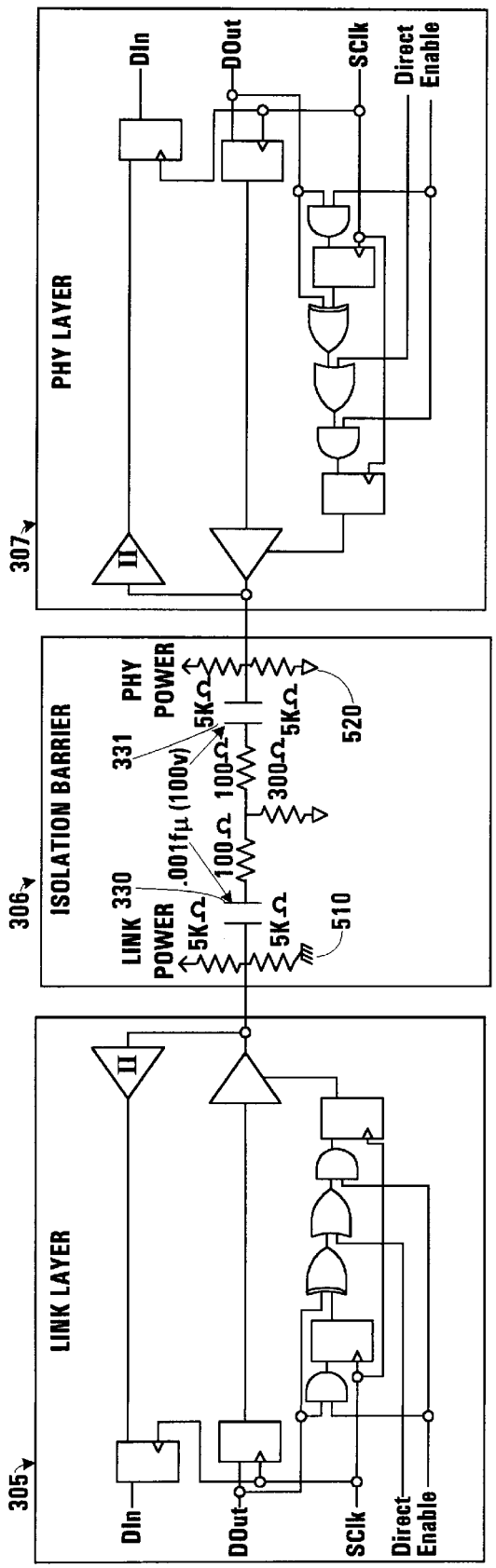
FIG. 3B is a schematic of another embodiment of an isolation barrier of the present invention.

FIG. 3B is a schematic diagram of an exemplary embodiment of isolation barrier 306 of the present invention. It is appreciated that a number of well known circuits could be used as isolation barrier 306. The passage of direct current between link layer chip 305 and physical layer 307 is prevented by capacitors 330 and 331. In this embodiment capacitors 330 and 331 also maintain isolation between isolated ground reference 520 and chassis ground reference 510.

Figure 4:
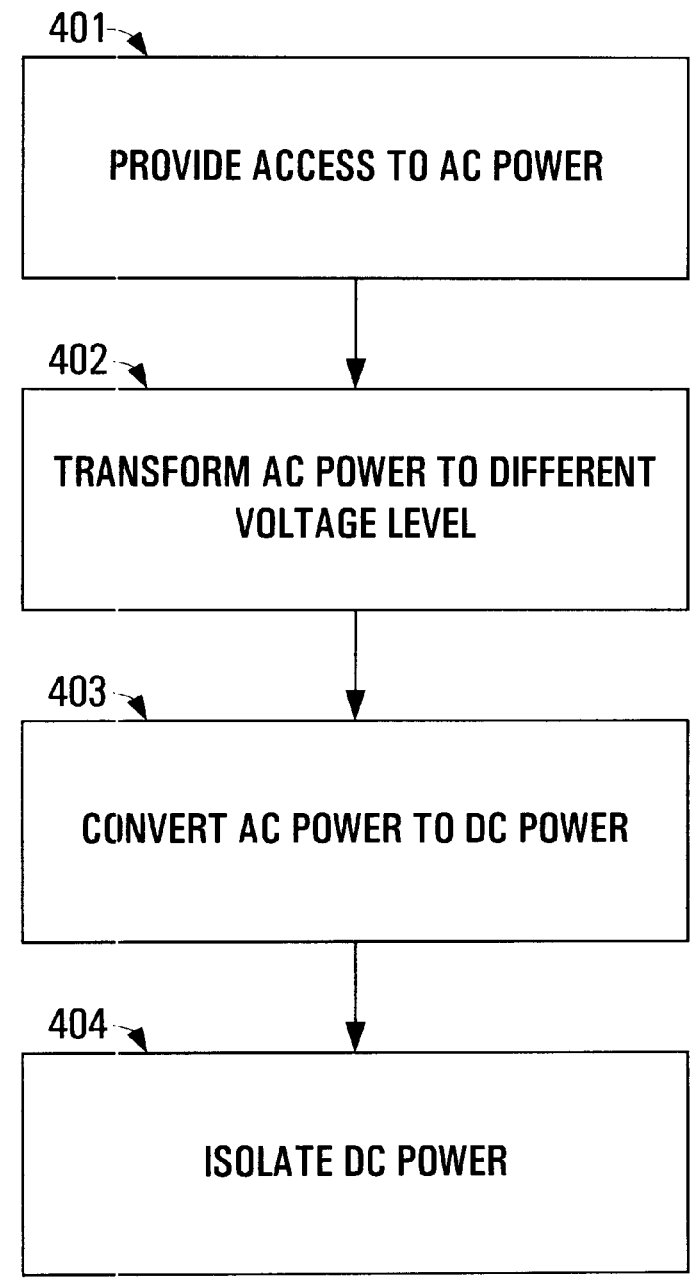
FIG. 4 shows a flow chart of steps for providing an isolated ground DC power supply in accordance with the present invention.

FIG. 4 shows a flow chart of one method 400 for providing an isolated ground reference direct current power supply of the present invention. In step 401 access to alternating current power is provided. In this embodiment the alternating current is provided by a standard 120 volt/60 hertz U.S. utility alternating power. There are a number of other ways of providing electrical power, such as a portable alternating current generator operating at a different voltage or frequency.

In step 402 the alternating current power is transformed into a different voltage level. In the present embodiment the power is transformed by a simple dual coil air gap transformer in accordance with the principles of mutual inductance described above. However, it is possible for the AC power to be transformed into a different alternating current voltage by a variety of different transformers. For example, a gas filled transformer, an iron core transformer, a shell type transformer, an auto transformer, a center tapped transformer, etc. It is also possible to change the voltage level to be changed by components other than a transformer, for example, an amplifier.

In step 403 of FIG. 4, the alternating current power is converted into direct current power. The present embodiment utilizes a diode biased in a manner to permit current to flow only in one direction to achieve full wave rectification. However, the alternating current may be converted to direct current using a variety of methods, for example, using well known cathode tube technology to achieve half wave rectification.

In step 404 of FIG. 4 the direct current power ground reference is isolated. The direct current ground reference becomes isolated by introducing enough ohmic isolation resistance between the original ground reference and the isolated ground reference. The ohmic isolation resistance between the two ground references must be enough to prevent current flowing between them. In the present embodiment this is accomplished by utilizing a transformer. The primary coil induces a voltage in the secondary coil. However, under ordinary operating conditions, no current flows between the primary and secondary sides of the transformer as long as there is no physical connection.

The present embodiment is capable of providing electrical power in a manner that adequately fulfills the differing requirements of the various components in a computer system. The isolated ground reference direct current power supply of the present embodiment is capable of providing voltages to components at the same or differing levels and with the same or isolated grounds. The present embodiment takes advantage of the efficiencies of incorporating all these features in an individual power supply, including lower manufacturing costs, minimized design coordination requirements, less complex fabrication arrangement and easier troubleshooting procedures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system comprising:
   a) an individual power supply comprising:
      an AC/DC converter coupled to receive an alternating current (AC) voltage and operable to generate a first direct current (DC) voltage and a first ground; and
      a DC to DC converter coupled to said AC/DC converter and operable to generate a second DC voltage and a second ground, wherein said first ground and said second ground are electronically isolated;
   b) a serial communication circuit operable to communicate with said computer system, said serial communication circuit comprising a physical layer circuit coupled to receive and powered by said second DC voltage and said second ground; and
   c) a processor coupled to a host bus, wherein said processor and said host bus are powered by said first DC voltage and said first ground.

2. A computer system as described in claim 1 wherein said serial communication circuit further comprises a link layer circuit coupled to said physical layer circuit, said link layer circuit powered by said first DC voltage and said first ground.

3. A computer system as described in claim 2 wherein said serial communication circuit is IEEE 1394 compliant.

4. A computer system as described in claim 3 wherein said serial communication circuit further comprises a plurality of ports coupled to said physical layer circuit, each port for interfacing with a serial communication cable and wherein each serial communication cable is coupled to receive said second DC voltage and said second ground.

5. A computer system as described in claim 2 wherein said individual power supply unit further comprises:
   a transformer coupled to receive an alternating current (AC) voltage;
   a rectifier circuit coupled to said transformer for changing said alternating current voltage from said transformer into a pulsating direct current voltage; and
   a filter coupled to said rectifier circuit which eliminates fluctuations in said pulsating direct current voltage.

6. A computer system as described in claim 5 wherein said transformer further comprises:
   a primary inductance coil for receiving alternating current; and
   a center tapped secondary inductance coil electrically coupled to said primary inductance coil for inducing a current in said center tapped secondary inductance coil, wherein the center tap off of said center tapped secondary inductance coil is coupled to said first ground reference.

7. A computer system as described in claim 6 wherein said rectifier circuit further comprises:
   a positive half cycle diode adapted to pass electrical current during a positive half cycle of electrical current through said primary inductance coil and block the passage of electrical current during a negative half cycle of electrical current through said primary inductance coil; and
   a negative half cycle diode coupled to said positive half cycle diode for passing electrical current during a negative half cycle of electrical current through said primary inductance coil and blocking the passage of electrical current during the positive half cycle of electrical current through said primary inductance coil.

8. A computer system as described in claim 5 wherein said DC to DC converter further comprises:
   an insulated gate bipolar transistor for operating as a high frequency switch that closes causing direct current to increase and opens causing direct current to decrease;
   a converter primary inductance coil coupled to said insulated gate bipolar transistor for generating a field of magnetic flux;
   a converter secondary inductance coil electrically coupled to said converter primary inductance coil for receiving electrical energy from said field of magnetic flux and inducing a fluctuating current to flow in said converter secondary inductance coil; and
   a field diode coupled to said converter secondary inductance coil for permitting electrical current to flow in only one direction.

9. A computer system comprising:
   a) an individual power supply comprising:
      a means for generating a first direct current (DC) voltage and a first ground; and
      a means for generating a second DC voltage and a second ground, wherein said first ground and said second ground are electronically isolated in accordance with the requirements of the IEEE 1394 communications standard;
   b) a serial communication means for providing communication between said computer system and peripherals, said serial communication circuit comprising:
      a link layer means coupled to receive said first DC voltage and said first ground; and
      a physical layer means coupled to said link layer circuit and coupled to receive said second DC voltage and said second ground; and
   c) a processor coupled to a host bus, wherein said processor and said host bus are powered by said first DC voltage and said first ground.

10. A computer system as described in claim 9 wherein said individual power supply comprises:
    a transformer means for transforming an alternating current voltage;
    a rectifier means for changing said alternating current voltage from said transformer into a pulsating direct current voltage, said rectifier means coupled to said transformer; and
    a filter means for eliminating fluctuations in said pulsating direct current voltage, said filter means coupled to said rectifier circuit.

11. A computer system as described in claim 10 wherein said transformer means further comprises:
    a primary inductance coil for receiving alternating current;
    a center tapped secondary inductance coil electrically coupled to said primary inductance coil for inducing a current in said center tapped secondary inductance coil, wherein the center tap off of said center tapped secondary inductance coil is coupled to a second ground reference.

12. A computer system as described in claim 11 wherein said rectifier means further comprises:
    a positive half cycle diode adapted to pass electrical current during a positive half cycle of electrical current through said primary inductance coil and block the passage of electrical current during a negative half cycle of electrical current through said primary inductance coil; and a negative half cycle diode coupled to said positive half cycle diode for passing electrical current during a negative half cycle of electrical current through said primary inductance coil and blocking the passage of electrical current during the positive half cycle of electrical current through said primary inductance coil.

13. A computer system as described in claim 9 wherein said means for generating a second DC voltage and a second ground is a DC to DC converter circuit.

14. A computer system as described in claim 13 wherein said DC to DC converter further comprises:

an insulated gate bipolar transistor for operating as a high frequency switch that closes causing direct current to increase and opens causing direct current to decrease;

a converter primary inductance coil coupled to said insulated gate bipolar transistor for generating a field of magnetic flux;

a converter secondary inductance coil electrically coupled to said converter primary inductance coil for receiving electrical energy from said field of magnetic flux and inducing a fluctuating current to flow in said converter secondary inductance coil; and a field diode coupled to said converter secondary inductance coil for permitting electrical current to flow in only one direction.

15. A computer system as described in claim 9 wherein said serial communication means further comprises a plurality of ports coupled to said physical layer circuit, each port for interfacing with a serial communication cable and wherein each serial communication cable is coupled to receive said second DC voltage and said second ground.

16. A method of providing power to elements of a computer system, said method comprising the steps of:

a) receiving an alternating current supply;

b) transforming said alternating current supply into a first direct current (DC) voltage and a first ground using an AC/DC converter component; and c) generating a second DC voltage and a second ground, that are electrically isolated from said first DC voltage and said first ground, by supplying said first DC voltage and said first ground to a DC to DC converter.

17. The method of claim 16 further comprising the steps of:

d) supplying said first direct current (DC) voltage and first ground to a link layer circuit of a serial communication device that is IEEE 1394 compliant; and e) supplying said second direct current (DC) voltage and second ground to a physical layer circuit of said serial communication device.

18. The method of claim 17 wherein step d) further comprises introducing an ohmic isolation resistance between an input direct current voltage and an output direct current voltage, said ohmic isolation resistance having a magnitude sufficient to prevent the flow of current between the input direct current voltage and the output direct current voltage.

19. The method of claim 16 wherein step c) further comprises prohibiting a fluctuating current through diode during one half the cycle of said fluctuating current and permitting it to flow through the diode during the other half of the fluctuating current cycle resulting in a pulsating direct current.

20. The method of claim 19 wherein step c) further comprises smoothing out said pulsating direct current by storing electrical energy in a manner that opposes changes in the current flow.

* * * * *